Feb. 26, 1952          E. R. PRICE          2,587,524
CLUTCH CONTROL MECHANISM
Filed June 24, 1947                      2 SHEETS—SHEET 2

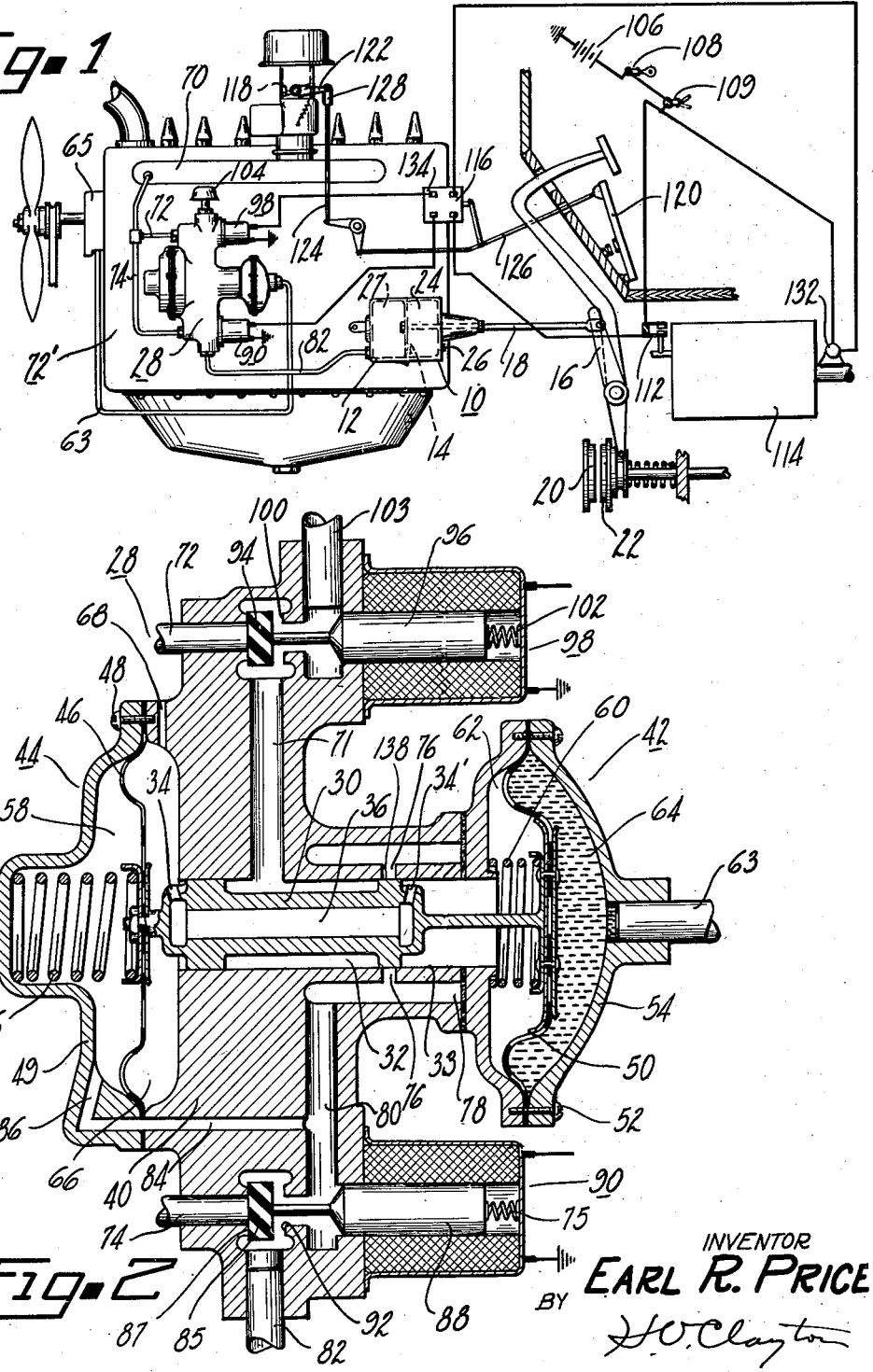

INVENTOR
EARL R. PRICE
BY
H. O. Clayton
ATTORNEY

Patented Feb. 26, 1952

2,587,524

UNITED STATES PATENT OFFICE 2,587,524

CLUTCH CONTROL MECHANISM

Earl R. Price, South Bend, Ind., assignor to Bendix Aviation Corporation, South Bend, Ind., a corporation of Delaware Application June 24, 1947, Serial No. 756,640

7 Claims. (Cl. 192—.052)

This invention relates in general to power operated clutch control mechanism adapted to be included in the power plant of an automotive vehicle, and in particular to a valvular means constituting the principal part of the control means of said mechanism.

The invention is directed to the improvement of the automatic clutch control such for example as that included in certain of the present day cars, wherein the throttle operating means of the vehicle controls valve mechanism of a manifold vacuum operated motor operably connected to the clutch. In this type of mechanism the power element of the clutch motor is subjected to a varying differential pressure to regulate the disengagement and engagement of the clutch, and it is an object of the present invention to provide means for varying said differential pressure to effect a controlled engagement of the clutch, the operation of said means being a function of the operation of the engine of the vehicle.

It is an object of my invention to provide a single acting clutch motor comprising a cylinder housing a reciprocable piston operably connected to the friction clutch of an automotive vehicle; and there may be provided a three-way valve constituting part of the control valve means of said motor, said valve serving to alternately connect one end of the cylinder with the manifold and with a bleed valve mechanism, to initiate respectively, the clutch disengaging and engaging operations of the motor. This bleed valve mechanism is provided for controlling the influx of air into the cylinder to vary the loading of the clutch plates; and one important feature of the present invention is directed to the construction and mode of operation of said latter valve means.

To this end there is provided a pressure balanced bleed valve, said valve and the means for operating the same being so constructed and so interconnected with the engine of the vehicle as to render the operation of the valve a function of the R. P. M. of the engine and therefore directly proportional to the R. P. M. of the driving element of the friction clutch. This is an important feature of the invention, for heretofore the bleed valve mechanism of clutch control means has ofttimes been operated by engine intake manifold vacuum operated means which means is however subject to extraneous variables, resulting in an undesired variable operation of the valve. The prior art controlling means for the bleed valve of the clutch control mechanism does not suggest a valve structure, such as the particular valve means disclosed herein, wherein the clutch control mechanism provides for a loading of the clutch plates to engage the clutch, the loading being in direct proportion to the engine torque. In a preferred embodiment of the invention the aforementioned bleed valve is operated in accordance with the pressure developed by the water pump of the vehicle.

One of the most important features of my invention is to provide a fluid pressure operated motor for operating the friction clutch of an automotive vehicle which includes a change speed transmission in its power plant, said motor being controlled by a pressure balanced follow up to lap three-way valve which is automatically cut out of operation when the transmission is established in a relatively high gear setting and then automatically cut back into operation when the accelerator is released to a certain position as the vehicle is slowed down to a certain speed with the transmission established in the latter setting.

Yet another object of my invention is to provide a pressure balanced three-way valve, the operation of which is controlled by two pressure differential operated motors, one of which is controlled by the hydrostatic pressure developed by a water pump.

Another object of the invention is to provide a clutch control mechanism operative to completely separate the clutch plates to disengage the clutch, and further operative to effect two distinct stages of clutch engaging movement of the driven clutch plate, the first stage being relatively rapid and serving to bring the plates just short of engagement and the second stage being relatively slow and accomplished in a succession of short increments of movement to effect a progressively increasing loading of the plates to engage the clutch. A feature of the invention lies in the provision of means for automatically terminating the aforementioned first and rapid stage of movement when the clutch plates are slightly separated.

Yet another object of my invention is to provide a clutch control mechanism for an automotive vehicle, said mechanism including a single acting pressure differential operated motor operable to disengage the clutch when the accelerator is released to a certain position, the transmission at the time being established in either its first or second gear setting; operable to disengage the clutch when the accelerator is released to the aforementioned position, the transmission being established in its high gear setting and the vehicle travelling at or below a certain speed;

and also operable to control the engagement of the clutch in accordance with the speed of the engine of the vehicle.

Another object of my invention is to provide a pressure balanced valve for controlling the operation of a clutch operating pressure differential operated motor, said valve being operable to effect a certain partial engagement of the clutch when the accelerator is positioned to effect a certain relatively low speed of the engine and the transmission of the vehicle is at the time established in its high gear setting.

A further object of my invention is to provide a mechanism for operating the friction clutch of an automotive vehicle the engagement of the clutch by said mechanism being controlled in accordance with the speed of the engine, said operation being very sensitive to change in engine speed and quickly effected.

The above and other objects and features of the invention will appear more fully hereinafter from a consideration of the following description taken in connection with the accompanying drawings wherein an embodiment of the invention is illustrated by way of example.

Figure 1 is a diagrammatic view of one embodiment of the clutch control mechanism constituting the present invention;

Figure 2 is a sectional view disclosing the details of the control valve of the mechanism of Figure 1;

Figure 3:
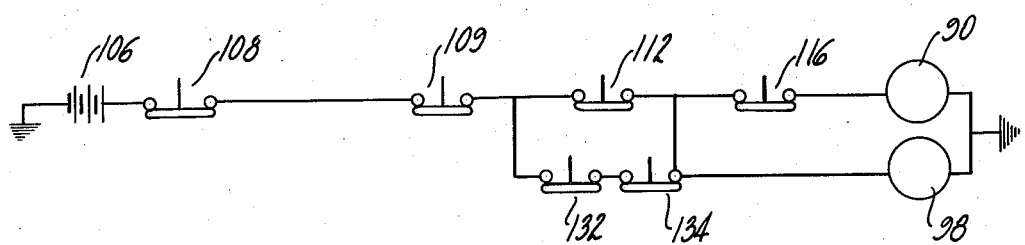
Figure 3 is a view disclosing the electrical hook-up of the mechanism of Figure 1.

Referring now to the preferred embodiment of the invention disclosed diagrammatically in Figure 1, as a part of the power plant of an automotive vehicle there is provided a single acting clutch motor 10 comprising a cylinder 12, said cylinder housing a reciprocable piston 14 constituting the power element of the motor and preferably connected to a clutch operating crank 16 by a link 18. The crank 16 serves to operate a conventional friction clutch of the power plant, said clutch comprising driving and driven plates 20 and 22 respectively. A compartment 24 of the motor 10 is at all times vented to the atmosphere via an opening 26; and a control compartment 27 of the motor, outlined by the piston 14 and part of the cylinder 12, is alternately evacuated and vented to the atmosphere to successively disengage the clutch and effect an engagement thereof.

The control of the flow of power fluid into and from the compartment 27 is effected by valvular means comprising a unit indicated as a whole by the reference numeral 28; and the principal feature of said unit lies in a pressure balanced three-way bleed valve comprising a spool shaped member 30 including a recess 32 and end portions provided with opening 34 and 34'. The openings 34 and 34' cooperate with a cylindrical duct 36 extending through the valve 30; and the latter is slidable within a cylindrically shaped bore 38 in the casing of the valve unit.

Valve member 30 is preferably actuated by two separate pressure differential operated motors 42 and 44, the latter including a movable power element 46 secured in place by fastenings 48 extending through a motor casing member 49 and the element 46 and into the body portion 40 of the valve unit. The motor 42 preferably includes a power element 50 secured in place by fastenings 52 which extend through a motor casing member 54, the power element 50 and into a portion of the body 40 of the valve unit. A spring 56 of a certain rate is mounted within a compartment 58 of the motor 44 said spring serving to bias the power element 46 to the right, Figure 1; and a spring 60 of a certain rate is mounted within a compartment 62 of the motor 42 said spring serving to bias the power element 50 to the right, Figure 1.

A compartment 64 of the motor 42 is filled with water and is placed in fluid transmitting connection with a conduit 63 leading to the delivery side of the engine driven water pump 65 of the vehicle, said pump serving as part of the conventional cooling system of the power plant of the vehicle. A compartment 66 of the motor 44 is at all times vented to the atmosphere via a duct 68 in the body 40 of the unit; and as disclosed in Figure 2, said compartment 66 is at all times in air transmitting connection with the motor compartment 62 of the motor 42 via the openings 34 and 34' in the valve member 30, the duct 36 in said valve member and the interior of the valve casing, that is, the bore 38.

The recess 32 of the valve 30 is adapted to be placed in fluid transmitting connection with the intake manifold 70 of the engine 72' of the vehicle via a duct 71 in the valve body 40, a conduit 72, and a conduit 74 connected with the conduit 72; and when the valve member 30 is moved to the right, Figure 1, the valve recess 32 registers with ports 76 in the valve casing, said ports serving to interconnect the bore 38 of the valve unit with a recess 78 in said unit. The recess 78 is placed in fluid transmitting connection with the control compartment 27 of the clutch motor 10 via a duct 80 in the valve body 40 and a conduit 82; and said recess 78 is also in fluid transmitting connection with the compartment 58 of the valve operating motor 44 via a portion of the duct 80 and interconnected ducts 84 and 86.

A valve member 85, connected to the armature 88 of a grounded solenoid 90 serves, when in the position disclosed in Figure 2, to connect the valve recess 78 with the compartment 27 of the clutch motor 10; and when the solenoid 90 is energized the valve member 85 is moved to the right, Figure 1, to seat at 92 thereby connecting the aforementioned compartment 27 with the intake manifold 70 via the conduit 82 and the conduit 74. When the solenoid 90 is de-energized a spring 75 expands to seat the valve 85 at 87 thereby connecting the motor chamber 27 with the bleed valve 30 via the conduit 82, duct 80, chamber 78 and ports 76.

The fluid transmitting connection between the intake manifold and the pressure balanced bleed valve 30 is controlled by a cut out valve member 94 which is operably connected to the armature 96 of a grounded solenoid 98. When the solenoid 98 is energized the valve member 94 is seated at 100 thereby interconnecting the conduit 72 with the valve duct 71; and when said solenoid is de-energized a spring 102 within the casing of the solenoid serves to bias the valve member 94 to the position disclosed in Figure 2, thereby venting the duct 71 to the atmosphere via a conduit 103 and an air cleaner 104.

Figure 4:
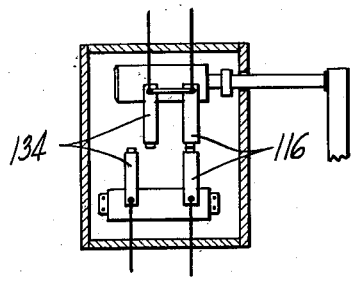
Figure 4 is a sectional view of the accelerator operated switch mechanism of Figure 1 disclosing the details of said mechanism.

As disclosed in Figure 3, the solenoid 90 may be controlled by an electrical circuit including, in series, a grounded battery 106, an ignition switch 108 of the electrical controls of the power plant, a cut out switch 109, a normally closed transmission operated switch 112 which is opened when the change speed transmission 14 of the vehicle is established in its high gear setting, and an accelerator operated switch 116, Figure 4, which is closed immediately after the throttle valve 118 of the vehicle is closed and during the last increment of the releasing movement of the accelerator. As is disclosed in Figure 1, the throttle 118 may be connected to the accelerator 120 by interconnected links 122, 124 and 126, there being a lost motion connection 128 in the connection between the links 122 and 124 to make possible the above described closure of the switch 116 after the throttle is closed. It follows that with this construction when the accelerator is depressed to open the throttle valve 118 the switch 116 is opened to de-energize the solenoid 90 said de-energization being effected immediately prior to an opening of the throttle beyond its engine idling position.

There is thus provided, by the solenoid operated valve 85, means for connecting the clutch motor 10 to the intake manifold when the accelerator is completely released, and for connecting said motor to the bleed valve 30 when the accelerator is depressed to open the switch 116; and the parts of the mechanism of my invention are so constructed and arranged and so operative that when the valve 85 is operated to connect the motor 10 with the intake manifold said motor is then vacuum energized to effect an appreciable separation of the clutch plates 20 and 22, that is, a disengagement of the clutch.

Referring again to Figures 1 and 3, it will be noted that the grounded solenoid 90 may also be controlled by a normally open switch 132 which is closed by a vehicle speed responsive governor, not shown, when the vehicle is slowed down to a certain speed; and this switch is electrically connected in series with another accelerator operated switch 134, Figure 4, adapted to be closed when the accelerator is released to a position to effect a certain relatively low speed of the engine, say 800 R. P. M. For a purpose to be brought out in the description to follow, the R. P. M. of the engine at which the switch 134 is closed is a relatively small factor above the engine idling R. P. M. of the engine.

The two switches 132 and 134 are electrically connected in parallel with the transmission operated switch 112 accordingly there is thus provided electrical means for effecting an energization of the solenoid 90 when the accelerator is released the transmission being at the time established in any of its settings but is high gear setting; and when the accelerator is released, the transmission is established in its high gear setting, and the vehicle is travelling at or below a certain speed.

As to the control of the solenoid 98, a study of the electrical hook-up of Figures 1 and 3 will reveal the fact that this solenoid is controlled by either the transmission operated switch 112 or the governor operated switch 132 and accelerator operated switch 134, there being thus provided electrical means operative to open the valve 85 when the transmission is established in any of its settings except its high gear setting and also operative to open said valve when the accelerator is released to a certain position as the vehicle is slowed down to a certain speed when the transmission is established in the aforementioned high gear setting.

Describing now the complete operation of the clutch control mechanism of my invention, it will be assumed that the engine 72' is idling thereby making of the intake manifold 70 a source of vacuum; that the car is at a standstill; and that the transmission of the vehicle is in its neutral setting. The solenoid 90 is at this time energized to open the valve 85 thereby effecting a disengagement of the clutch by the operation of the motor 10; and the solenoid 98 is at the time energized thereby opening the valve 94 to interconnect the then partially evacuated intake manifold 70 with the pressure balanced three-way bleed valve 30. Now the construction and arrangement of the parts of the bleed valve mechanism and the means for operating the same including the rates of the springs 56 and 60 is such that when the engine is idling and the valve mechanism is connected to the intake manifold, then the valve 30 will be positioned as disclosed in Figure 2. The valve 30 is then said to be balanced, that is lapped, a land portion 138 of the valve then covering the ports 76.

Describing this valve balancing operation in greater detail, the spring 56 is strong enough to move the valve 30 to the right, Figure 2, to register the recess 32 with the ports 76, when the duct 71 is vented to the atmosphere via the air cleaner 104, and the engine is idling to effect a minimum of pressure of the water in the motor compartment 64. However, when the duct 71 is connected to the source of vacuum, that is, the intake manifold, then the compartment 58 of the motor 44 is partially evacuated, the air flowing from said compartment via ducts 84, 86, and 80, chamber 78, ports 76, recess 32, duct 71 and conduit 72. The piston 46 is then subjected to a differential of pressure biasing the piston to the left, Figure 2, to compress the spring 56 and lap the valve 30. Now the degree of vacuum, that is, gaseous pressure within the compartment 58 at which the aforementioned valve lapping operation is effected is preferably equal to that of the compartment 27 of the clutch motor 10 when said motor is energized sufficiently to separate the clutch plates a relatively short distance, that is, a distance just sufficient to separate the clutch plates.

The clutch having been disengaged and the valve 30 moved to its lapped position, the power plant is prepared for an operation of the transmission; and the driver will then probably operate the gear shift lever, not shown, to establish the low gear setting of said transmission. To get the car under way the clutch is then engaged and this operation is effected by depressing the accelerator. As described above the first increment of movement of the accelerator effects an opening of the switch 116 thereby de-energizing the solenoid 90. The spring 75 then operates to close the valve 85 thereby connecting the motor chamber 27 with the balanced bleed valve member 30. Now the closing of the valve 85 results in the automatic operation of the valve 30 to increase the gaseous pressure within the motor compartments 27 and 58. Describing this operation, air is drawn out of the compartment 58 thereby effecting a movement of the valve 30 to the left, Figure 2, to vent the compartments 27 and 58 to the atmosphere until the gaseous pressure in said compartments reaches the aforementioned factor, that is, the factor necessary to effect a balancing of the valve 30 and a slight separation of the clutch plates.

Now it is to be remembered that the above described operation of the motor 44, and incidental operation of the valve 30, are effected prior to an opening of the throttle. When the accelerator is depressed sufficiently to open the throttle there results a speeding up of the engine, the degree of engine R. P. M. effected in this operation depending, of course, upon the degree of depression of the accelerator. If the R. P. M. is increased to say a factor of 600 from an engine idling factor of say 550 R. P. M. and held there, then there will be a corresponding increase in water pressure within the motor compartment 64 said pressure acting upon the piston 60. The balance of forces acting upon the valve 30 is upset by this increase in engine speed thereby moving said valve to the left, Figure 2, to vent the motor compartments 58 and 27 to the atmosphere. The gaseous pressure within the latter compartments is thus increased, the increase of the pressure in the compartment 27 resulting in a certain loading of the clutch plates and the increase in pressure in the compartment 58 resulting in an operation of the spring 56 to again lap, that is, balance the valve 30.

There is thus effected a certain loading of the clutch plates, the degree of said loading being directly proportional to the speed of the engine. To further load the clutch plates by the operation of the clutch spring 21 the driver will again, that is, continue the depression of the accelerator to effect another increment of its throttle opening movement; and this operation, as with the operation just described, will again effect an operation of the valve 30 to effect another clutch engaging operation of the motor 10. In this operation the valve 30 will be again lapped when the forces acting upon the same are balanced. The throttle opening operation of the accelerator is then repeated until the clutch is completely engaged.

There is thus provided a clutch control mechanism wherein the engagement of the clutch is effected in two stages, the first, that is, relatively rapid stage, being effected by the operation of de-energizing the solenoid 90; and the second, or clutch plate contact stage, being effected in one or more steps by an operation of the balanced three-way valve 30. It is to be remembered that in the first stage operation, the valve 30 is lapped when the gaseous pressure within the motor compartment 58 is equal to the pressure within the motor compartment 27; and that this operation is effected when the clutch plates are slightly separated; and thereafter the loading of the clutch plates is progressively increased, the degree of loading being directly proportional to the R. P. M. of the engine. This particular loading of the clutch plates is to be desired inasmuch as the force transmitted by the clutch is a function of the degree of loading of its plates; and said loading should be directly proportional to the torque of the engine; for if the clutch plates are loaded too heavily when the engine speed is low, then there will result a stalling of the engine.

Continuing the description of the operation of the mechanism constituting my invention, after the clutch has been engaged with the transmission established in its low gear setting the car will move forwardly at a speed depending upon the degree of opening of the throttle and when the desired speed is reached the driver will probably disengage the clutch by releasing the accelerator and then operate the transmission to establish the same in its second gear setting; and this operation of the clutch is effected in the same manner as described above, that is, the operation of the clutch in effecting the first gear setting of the transmission. Then when the desired vehicle speed is reached in second gear the driver will again disengage the clutch by releasing the accelerator to operate the valve 85 whereupon he will place the transmission in its high gear setting. Now as mentioned above when tihs setting is effected the switch 112 is automatically opened thereby closing the valve 94 to vent the duct 71 to the atmosphere.

It is apparent therefore that with the transmission established in its high gear setting there is no automatic disengagement of the clutch upon release of the accelerator until the speed of the vehicle is reduced sufficiently to effect a closing of the switch 132 and the accelerator is released sufficiently to close the switch 134. With such a mechanism the driver may cruise in high gear at a relatively low car speed such for example as the speed desired when driving in a funeral procession; for the clutch is not disengaged until the accelerator is released to a point to reduce the engine R. P. M. to the aforementioned 800 factor. With the accelerator in this released position the switch 134 is closed to effect an opening of the valve 94. The valve 30 is then automatically operated to effect a clutch disengaging operation of the motor, the clutch plates being then slightly loaded to slip the clutch. Explaining the latter operation when the valve 94 is opened the slightest leakage of air past the lands 138 of the valve member 30 from the compartment 58 and into the duct 71, results in a movement of said member to the left, Figure 2, to connect the motor compartments 27 and 58 to the intake manifold 70; then when the accelerator is released sufficiently to idle the engine the valve 30 will be operated to separate the clutch plates the aforementioned slight distance.

With the vehicle traveling in high gear below governor speed the clutch is thus slipped, that is partially disengaged, when the driver releases the accelerator to a position to close the switch 134 the throttle at the time being slightly opened. To re-engage the clutch the driver will depress the accelerator sufficiently to open the switch 134 thereby closing the valve 94, said operation resulting in a venting of the pressure valve 30 to the atmosphere; and the latter operation will result in a re-engagement of the clutch the valve being lapped when the accelerator is held in a fixed throttle open position. A subsequent depression of the accelerator will result, as explained above, in a continued follow-up to lap operation of the valve 30 to increase the loading of the clutch plates.

There is thus provided a simple and compact clutch control mechanism for operating the friction clutch of the power plant of an automotive vehicle, said power plant including a multi-speed transmission. With the vehicle traveling in high gear below governor speed to operate the switch 134 the pressure balanced three-way valve 30 serves as the principal control valve unaided by the control valve 85, the accelerator then being operated merely to operate the switch 134 and to close and open the throttle without closing the switch 116; and said valve 30 serves as a second stage three-way bleed valve in cooperation with the three way first stage valve 85 when the accelerator is completely released to close the switch 116 and then depressed to open said switch and open the throttle. With the mechanism of my invention the balanced valve 30 effects an engagement of the clutch which is directly proportional to the engine torque; furthermore with my invention the minimum of links and levers for operating the valve 30 provide a mechanism in which the clutch engaging operation of the motor 10 quickly reflects the engine torque. It is also to be noted that with the clutch control mechanism of my invention the driver, to facilitate a parking of the car when the transmission is established in either low gear or second gear, may engage and disengage the clutch, that is increase or decrease the loading of the clutch plates, by depressing and releasing the accelerator in its operation of the throttle; and it is to be noted that the three-way valve 85 and its operating solenoid 90 may be eliminated from the mechanism of my invention in which case however there would be no stage operation of the clutch.

Although only one embodiment of the invention has been illustrated and described, various changes in the form and relative arrangements of the parts may be made to suit requirements.

I claim:

1. Power means adapted to operate the friction clutch of an automotive vehicle including a single acting pressure differential operated motor, fluid transmitting means connected to one end of the motor and adapted at its other end to be connected to a source of vacuum, and means for controlling the operation of the motor including a valve unit comprising a body member, a valve member reciprocable within the body member, a spring and pressure differential operated motor including a power element operably connected to one end of the valve member, and another spring and pressure differential operated motor including a power element connected to the other end of the valve member.

2. Mechanism for operating the friction clutch of an engine driven vehicle, the power plant of said vehicle including a cooling system comprising a water pump, said mechanism comprising a fluid pressure motor, a pressure balanced follow up valve for controlling the operation of said motor including a movable valve member, means for actuating said member to control the operation of said valve including a vacuum operated motor adapted to be placed in fluid transmitting connection with the motor, and further including a fluid pressure operated motor comprising a compartment which is in fluid transmitting connection with the water pump.

3. A mechanism for operating the friction clutch of an engine driven vehicle including a single acting pressure differential operated motor, fluid transmitting means adapted to connect one end of said motor with a source of vacuum, valve means for controlling the motor incorporated in said fluid transmitting mechanism and including a three-way pressure balanced valve adapted to connect said motor either with the source of vacuum or with the atmosphere, another three-way valve incorporated in said fluid transmitting connection between the aforementioned three-way valve and the motor, motor means for controlling the operation of the former three-way valve including a spring and water pressure operated motor operable in accordance with the speed of the engine of the vehicle, a vacuum controlling three-way valve for controlling the operation of the pressure balanced valve, and electrical means for controlling the operation of both the second mentioned three-way valve and the vacuum controlling three-way valve.

4. A clutch control mechanism adapted to operate the friction clutch of an automotive vehicle comprising a change speed transmission, an accelerator, and a vehicle speed responsive governor, said clutch control mechanism including a pressure differential operated motor, a fluid transmitting connection connected with the motor and adapted to be connected to a source of suction, a three-way valve incorporated in said connection, said valve serving either to connect the motor with the source of vacuum or with the atmosphere, a solenoid for operating the three-way valve, electrical means, including means operated by the transmission and accelerator, for controlling the operation of the solenoid, fluid transmitting means connected with the valve and serving to provide a vent to the atmosphere, a pressure balanced valve incorporated in said fluid transmitting means and serving to control the flow of air into and from the motor, a fluid transmitting connection adapted to connect the latter means with the source of vacuum, valve means serving to cut off the vent of the pressure balanced valve to the atmosphere and to connect said valve with a source of vacuum via the latter fluid transmitting means, and electrical means, including an accelerator and governor operated means, for controlling the operation of the cut off valve means.

5. Power means adapted to operate the friction clutch of an automotive vehicle including a single acting pressure differential operated motor, fluid transmitting means connected to cne end of the motor and adapted at its other end to be connected to a source of vacuum, and valve means, incorporated in said fluid transmitting means, for controlling the operation of the motor comprising a valve unit including a body member comprising a port vented to the atmosphere, a plurality of ports adapted to be connected to the source of suction and a port adapted to be connected to the motor, a three-way valve member housed within said body member and operable to connect the motor with the source of vacuum or with the atmosphere, a pressure balanced valve also housed within said body member and operable to control the flow of air from the atmosphere to the motor, and means, including a solenoid operated valve, for connecting one of the vacuum ports with the pressure balanced three-way valve.

6. In an automotive vehicle provided with a friction clutch, a change speed transmission, an internal combustion engine including an intake manifold, a vehicle speed responsive governor and an accelerator; power means for operating the clutch including a pressure differential operated motor, fluid transmitting means interconnecting the motor and manifold, valve means for controlling the motor incorporated in the fluid transmitting means, said valve means including a three-way valve adapted to connect the motor either with the manifold or the atmosphere, a pressure balanced bleed valve adapted to control the connection between the three-way valve and the atmosphere, a vacuum cut-in valve adapted to connect the bleed valve with the manifold, electrical means, controlled in part by the transmission, for controlling the three-way valve, and electrical means, controlled by the governor and the accelerator, for controlling the vacuum cut-in valve.

7. In an automotive vehicle provided with a friction clutch, an internal combustion engine having an intake manifold, a vehicle speed responsive governor, an accelerator, and a three speeds forward and reverse transmission adapted to be established in a high gear setting; power means for operating the clutch comprising a single acting pressure differential operated motor having its power element connected to the clutch, fluid transmitting means interconnecting the motor with the intake manifold, a three-way valve incorporated in the fluid transmitting means said valve serving to connect the motor with either the intake manifold or the atmosphere, means for actuating the three-way valve including a solenoid, electrical means for controlling the solenoid including a transmission operated switch biased to a closed position and opened by the transmission when the same is established in its high gear setting, a pressure balanced valve supplementing the aforementioned three-way valve in the control of the motor, fluid transmitting means connecting the three-way valve with the pressure balanced valve, fluid transmitting means connected to the pressure balanced valve and serving to vent said valve to the atmosphere, fluid transmitting means providing a connection between the latter fluid transmitting means and the intake manifold, a cut off valve for controlling the latter connection, means for actuating the latter valve including a solenoid, and electrical means for controlling the latter solenoid to effect an opening of the cut off valve when the vehicle is traveling at or below a certain speed and the accelerator is released to a certain position, said electrical means including a switch actuated by the accelerator and a switch actuated by the governor.

EARL R. PRICE.

REFERENCES CITED

The following references are of record in the file of this patent:

UNITED STATES PATENTS

| Number | Name | Date |
|---|---|---|
| Re. 21,828 | Fleischel | June 17, 1941 |
| 2,049,738 | Hill et al. | Aug. 4, 1936 |
| 2,095,779 | Whittington | Oct. 12, 1937 |
| 2,134,519 | Kliesrath et al. | Oct. 25, 1938 |
| 2,391,192 | Price | Dec. 18, 1945 |